US012734997B2

(12) United States Patent
Ismail

(10) Patent No.: US 12,734,997 B2
(45) Date of Patent: Sep. 15, 2026

(54) INTERIOR WINDSHIELD WIPER WITH WATER VAPOR PUMP

(71) Applicant: KING FAISAL UNIVERSITY, Al-Ahsa (SA)

(72) Inventor: Abdelrahim Fathy Ismail, Al-Ahsa (SA)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 19/464,135

(22) Filed: Jan. 29, 2026

(65) Prior Publication Data

US 2026/0152151 A1 Jun. 4, 2026

Related U.S. Application Data

(63) Continuation-in-part of application No. 18/428,335, filed on Jan. 31, 2024, now abandoned.

(51) Int. Cl.

*B60S 1/52* (2006.01)
*B60S 1/04* (2006.01)
*B60S 1/48* (2006.01)

(52) U.S. Cl.

CPC ............... *B60S 1/524* (2013.01); *B60S 1/487* (2013.01); *B60S 1/0452* (2013.01)

(58) Field of Classification Search

None

See application file for complete search history.

(56) References Cited

U.S. PATENT DOCUMENTS

| | | | | |
|---|---|---|---|---|
| 1,052,637 | A | 2/1913 | Woodstrom | |
| 2,576,198 | A | 11/1951 | Stuart | |
| 3,846,867 | A | 11/1974 | Bryant | |
| 3,919,734 | A | 11/1975 | Mosley | |
| 4,177,928 | A * | 12/1979 | Bergkvist | B60S 1/56 239/129 |
| 5,383,247 | A * | 1/1995 | Nickel | B60S 1/546 15/250.04 |
| 11,292,433 | B1 | 4/2022 | Hardy | |
| 2008/0072392 | A1 | 3/2008 | Capoano | |
| 2018/0339678 | A1 * | 11/2018 | Paskov | B60S 1/488 |
| 2019/0270431 | A1 | 9/2019 | Clift | |

(Continued)

FOREIGN PATENT DOCUMENTS

| | | | |
|---|---|---|---|
| CN | 2633674 | Y | 8/2004 |
| CN | 202541489 | U | 11/2012 |

(Continued)

*Primary Examiner* — Omair Chaudhri

(74) *Attorney, Agent, or Firm* — Nath, Goldberg & Meyer; Joshua B. Goldberg

(57) ABSTRACT

An interior windshield wiper system of a vehicle includes a water tank and a heater located within the water tank. The heater heats contents of the water tank. A conduit leads from the water tank to an interior surface of a vehicle. Apertures of the conduit are located at an end of the conduit proximate to the interior surface, and may be covered by a porous plenum. The contents of the water tank can travel though the conduit, then through apertures, then through the porous plenum, and then onto the interior surface of the vehicle, such as a windshield. A wiper is located proximate to the interior surface to wipe the interior surface with the porous plenum.

13 Claims, 5 Drawing Sheets

(56) References Cited

U.S. PATENT DOCUMENTS

| | | | |
|---|---|---|---|
| 2022/0274614 | A1 | 9/2022 | Singer |
| 2022/0388483 | A1 | 12/2022 | Cutwright |

FOREIGN PATENT DOCUMENTS

| | | | | | |
|---|---|---|---|---|---|
| CN | 202935320 | U | | 5/2013 | |
| CN | 203078483 | U | | 7/2013 | |
| CN | 205239449 | U | | 5/2016 | |
| CN | 106364460 | A | | 2/2017 | |
| CN | 107139886 | A | * | 9/2017 | .............. B60S 1/546 |
| CN | 107521457 | A | | 12/2017 | |
| CN | 109278711 | A | | 1/2019 | |
| CN | 109421666 | A | | 3/2019 | |
| DE | 19603830 | A1 | * | 8/1997 | .............. B60S 1/524 |
| DE | 19607348 | A1 | * | 8/1997 | ............... B08B 1/10 |
| FR | 2532899 | A1 | | 3/1984 | |
| FR | 2907081 | A1 | * | 4/2008 | .............. B60S 1/524 |
| GB | 2081073 | A | | 2/1982 | |
| JP | H04110659 | U | | 9/1992 | |
| KR | 0131759 | Y1 | | 12/1998 | |
| KR | 19990005897 | U | | 2/1999 | |
| KR | 19990018433 | U | | 6/1999 | |
| KR | 19990027535 | U | | 7/1999 | |
| KR | 20160145307 | A | * | 12/2016 | .............. B60S 1/023 |
| KR | 20180023518 | A | | 3/2018 | |

* cited by examiner

DIRECTION OF
WIPING THE GLASS
WIPERS
125
130
WATER VAPOR
120
HEATER
115
POWER SOURCE
110
100
WATER TANK
105

260
240
270
225
250
240
230

260
250
270
226
226
240
225
240
230

INTERIOR WINDSHIELD WIPER WITH WATER VAPOR PUMP

CROSS-REFERENCE TO RELATED APPLICATION

This continuation-in-part patent application claims priority under 35 U.S.C. § 120 to U.S. patent application Ser. No. 18/428,335, filed on Jan. 31, 2024, in the U.S.P.T.O., the disclosure of which is incorporated by reference herein in its entirety.

TECHNICAL FIELD

The present disclosure relates to systems that clear a windshield of a vehicle, and more particularly, to a system that clears the inner windshield of a vehicle.

DISCUSSION OF THE RELATED ART

Car drivers suffer from blurred vision due to the presence of dust and fog on a car's windshield. There are windshield wipers that clear the outside of a car's windshield to improve visibility. However, on rainy days, days with high humidity, or cold days, the inside of a vehicle's windshield may also have low visibility.

SUMMARY

There is a need for a vehicle to have windshield wipers that operate on the inside of a windshield. A water vapor maker is integrated in the vehicle's windshield wipers, so that water vapor is pumped out when the wipers are turned on. The water vapor maker includes a water tank, a steam generator and a pump. The water in the tank is heated when the vehicle's wipers are operated to clear the inside portion of the windshield. The wipers spread water vapor on the glass and then a wiper arm moves to clean the inside of the glass.

An interior windshield wiper system, in one embodiment, includes a water tank and a heater located within the water tank. The heater heats the contents of the water tank. A conduit leads from the water tank to an interior surface of a vehicle. Apertures are located at an end of the conduit proximate to the interior surface, wherein the contents of the water tank travel though the conduit and apertures and onto the interior surface. A wiper is located proximate to the interior surface to wipe the interior surface.

The interior surface can be an interior windshield of a vehicle.

The apertures are part of the wiper in some embodiments.

The wiper can be configured to move horizontally across the interior surface, vertically across the interior surface, in an arc path across the interior surface, in a circular pattern across the interior surface, or a combination thereof.

A method to wipe an interior surface of a vehicle includes heating contents of a water tank with a heater to create water vapor; pumping the water vapor through a conduit and apertures onto an interior surface of a vehicle; and wiping the vapor dispersed through the apertures onto the interior surface with a wiper.

The interior surface can be a windshield.

The apertures can be a part of the wiper.

The wiper can move horizontally across the interior surface, vertically across the interior surface, in an arc path across the interior surface, in a circular pattern across the interior surface, or a combination thereof.

In an embodiment, an interior windshield wiper system includes a porous plenum covering at least one outlet opening of the conduit proximate to the interior windshield surface of the vehicle.

These and other features of the present subject matter will become readily apparent upon further review of the following specification.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
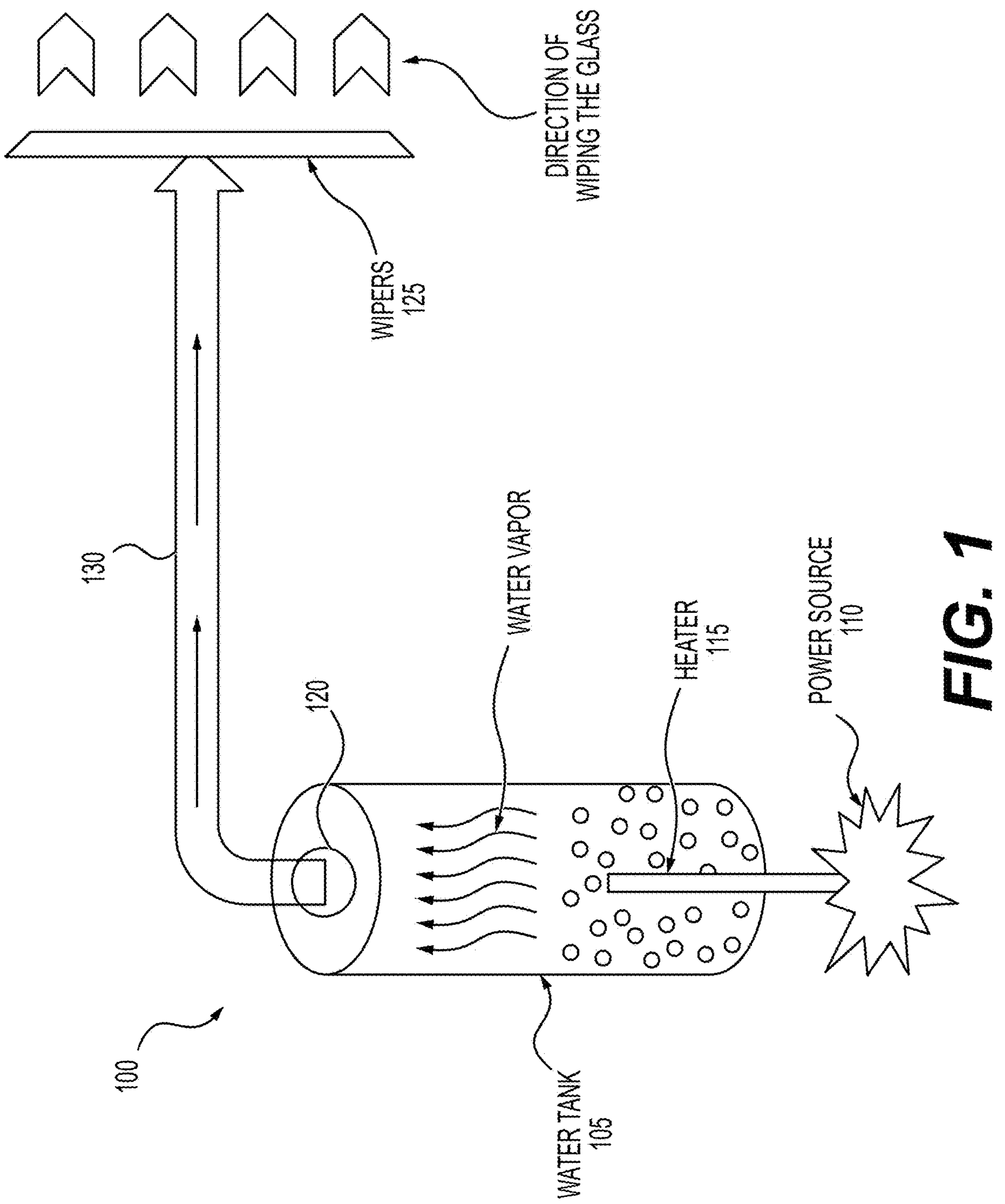
FIG. 1 is a diagram illustrating an interior windshield wiper system of a vehicle in accordance with an exemplary embodiment of the present subject matter.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

An interior windshield wiper system of a vehicle, such as a car, includes an integrated water vapor generator to generate steam or water vapor that assists in removing dust and fog on the inside of a windshield. The system includes a water vapor generator that pumps water vapor out of the wipers when the wipers are turned on, such that wipers spread water vapor on the glass and then the wiper arms move to remove the water vapor and clean the glass.

The water vapor generator includes a water tank, a heater, a power source, and a pump. The water in the water tank is heated when the car's interior wipers are operated from the inside of the vehicle.

The water tank and the heater are placed anywhere inside the vehicle body and are accessible to the wiper arms and the power source.

The wiper arms are designed to move in a variety of ways, such as back and forth in a horizontal or vertical direction, in a circular motion, or in a combination thereof.

The water tank is filled manually or automatically, such as through a connection to the car's cooling system.

FIG. 1 is an illustration of an interior windshield wiper system 100. It includes a water tank 105 and a power source 110. A heater 115 is powered by the power source 110 to heat water in the water tank 105. The heated water turns into steam or water vapor and a pump 120, also powered by power source 110, pumps the water vapor to the wipers 125 through a conduit 130.

The water tank 105, heater 115 and pump 120 can be located anywhere inside a vehicle's body. The conduit 130 leads to wipers 125 located at an interior of the windshield of the vehicle. The heater 115 heats water in the water tank 105 creating water vapor and the pump 120 pumps the vapor through the conduit 120 to the wipers 125.

The wipers 125 include small apertures allowing the water vapor being pumped through the conduit 120 to be sprayed onto the inside of the windshield of the vehicle. The wipers 125 can move vertically, horizontally or in circles depending on needs. In some cases the wipers can move in multiple directions. The wipers 125 can also be positioned on the inside of other windows of the vehicle, such as for example, side windows or rear windows.

Figure 2:
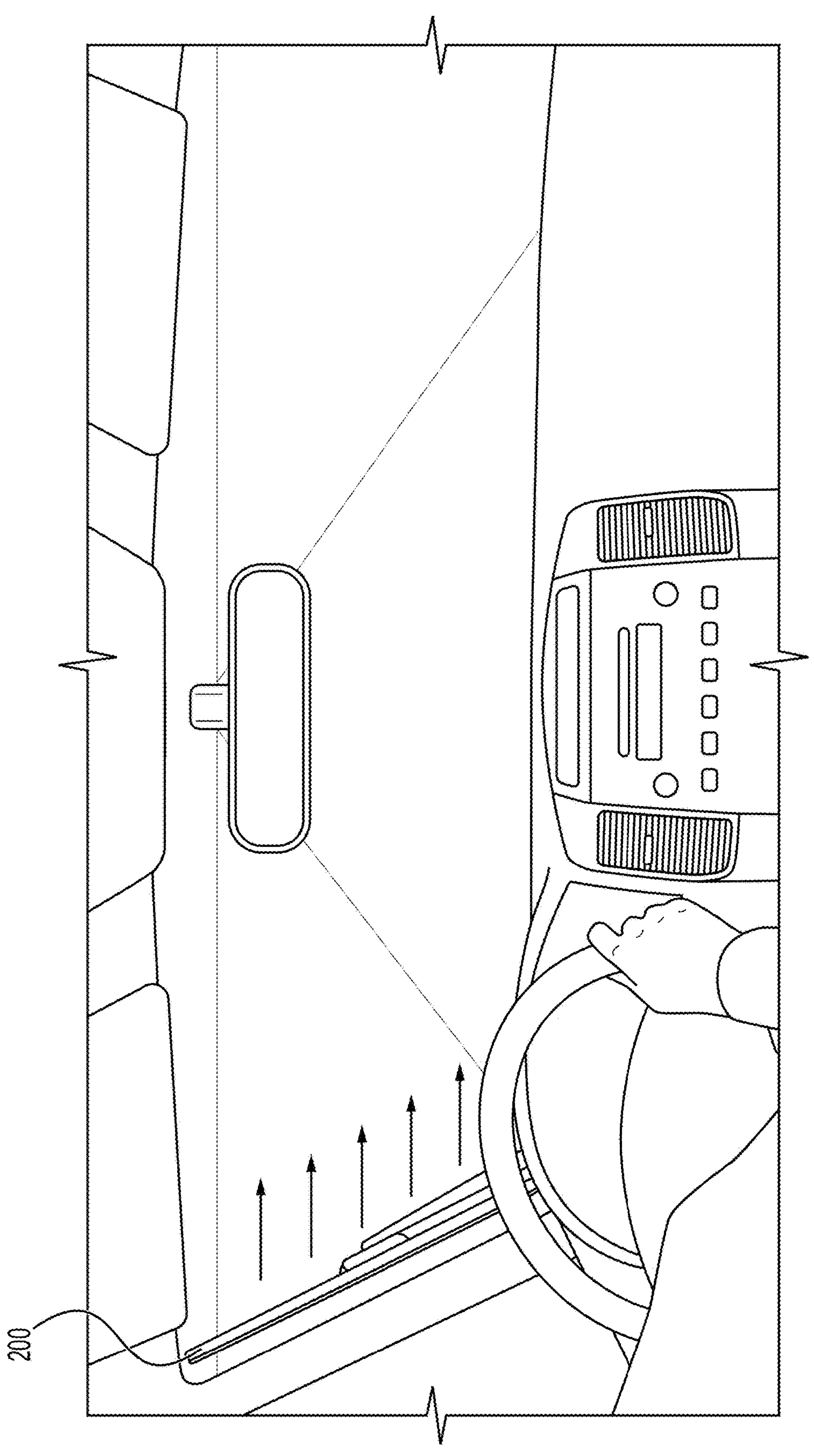
FIG. 2 is an illustration of an interior windshield wiper of a vehicle, in accordance with an exemplary embodiment of the present subject matter, moving in a horizontal direction across an interior of a windshield of the vehicle.

FIG. 2 is an illustration of an interior windshield wiper 200 moving in a horizontal direction across the interior of a windshield of a car. Water vapor is sprayed through the windshield wiper 200 to assist in cleaning the interior of the windshield.

The current innovation incorporates a water vapor generator designed to supply steam to the interior windshield wipers. This enables the wiping of the vehicle's interior windshield in horizontal, vertical, circular motions, arc path or a combination thereof. Positioned within the car body, in one embodiment adjacent to the engine, the water vapor generator includes a water tank, a power source, and a pump to propel water vapor into interior spaces through appropriate connectors. The wipers then disperse the water vapor onto the glass from the inside, effectively eliminating fog or dust.

Embodiments of the interior windshield wiping system include a water vapor generator and pump for the interior windshield wipers. Moreover, the water vapor generator utilizes a compact water tank and a car body-installed water heater connected to a power source.

In an approach, a porous plenum is placed in front of the wiper blade to cover the apertures of the conduit. The porous plenum is a porous material that allows water vapor received from the apertures of the conduit to pass through a body of the porous plenum.

The porous plenum can be fixedly or removably connected to the wiper blade.

The porous plenum, when present, is configured to evenly disperse the received water vapor across its body due to the pores contained in its body. The porous plenum is configured to uniformly eject the water vapor across the exterior surface area of its body. Since the porous plenum can come in contact with the interior side surface of the windshield and since the wiper blade can move the porous plenum across the interior side surface of the windshield, the porous plenum can be used to clean the interior surface area of the windshield uniformly and efficiently by wiping the interior of the windshield while releasing water vapor.

The porous plenum is configured to enable the water vapor to pass through it with a negligible degree of condensation, if any at all. However, even when a small degree of consideration may occur in/around the porous plenum, the condensation will form in a slow, controlled and non-dripping manner. As such, an interior vehicle wiping system of the present subject matter can be used to clean the interior surface area of a windshield with steam and without dripping water from the wiping blade/porous plenum assembly.

Figure 3:
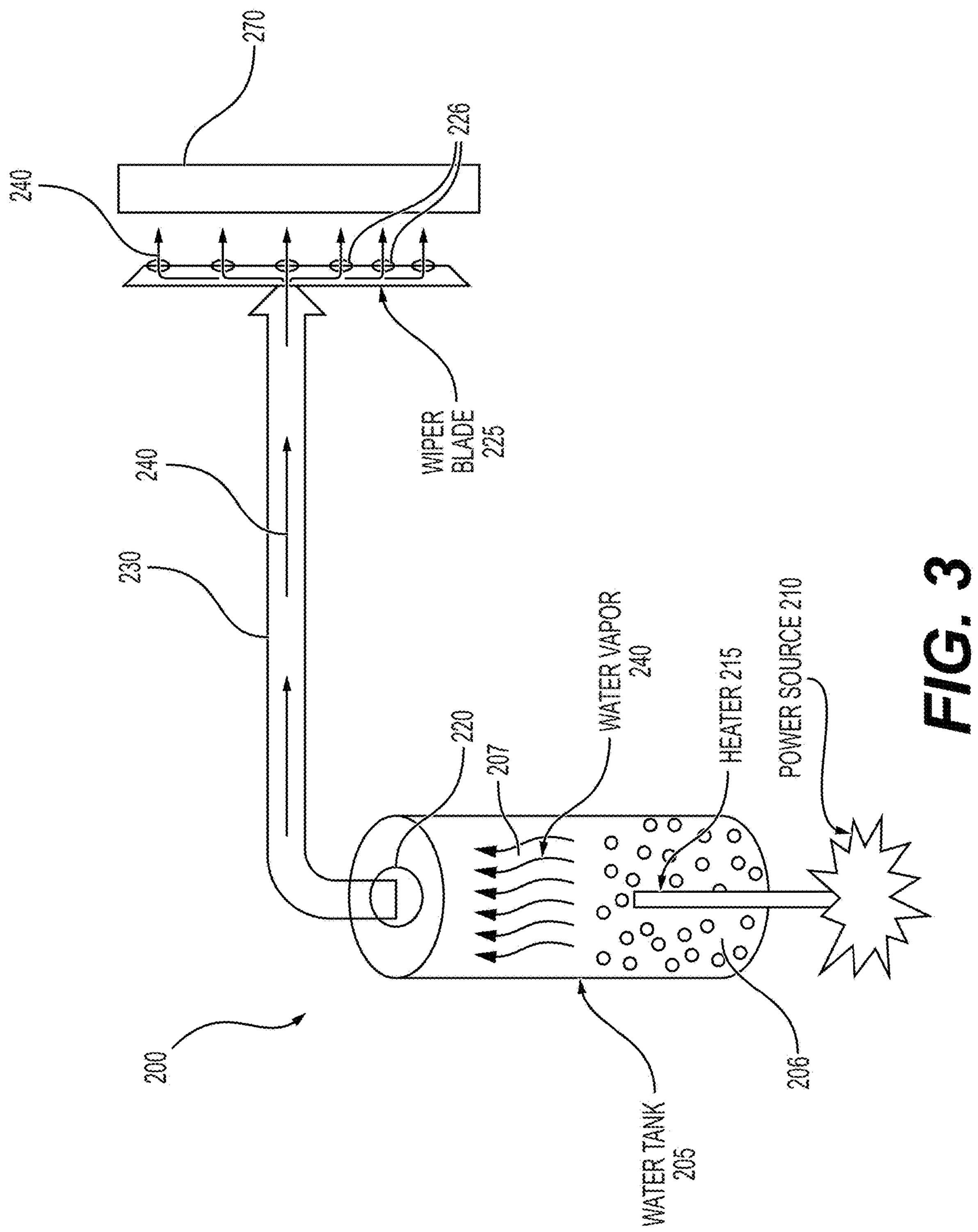
FIG. 3 is a diagram illustrating an interior windshield wiper system of a vehicle in accordance with an exemplary embodiment of the present subject matter.
Figures 4, 5:
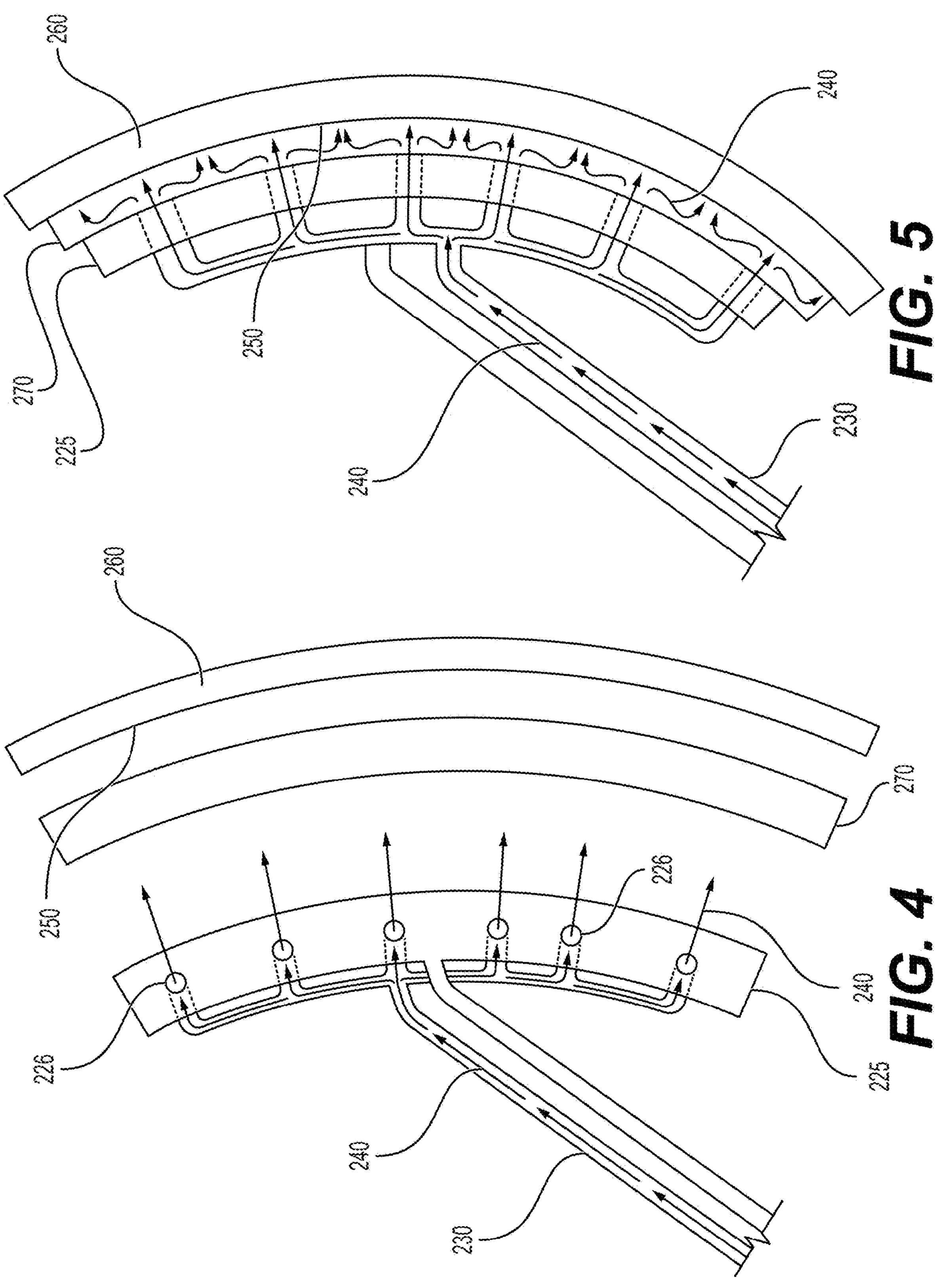
FIG. 4 is an exploded perspective view illustrating a portion of the interior windshield wiper system of FIG. 3.
FIG. 5 is a side view illustrating the portion of the interior windshield wiper system of FIG. 4.

Referring to FIGS. 3-5, an interior windshield wiper system 200 of a vehicle includes:

- a water tank 205 mounted to the vehicle, the water tank 205 having an interior storage area, the interior storage area having a first portion 206 configured to store water therein and a second portion 207 configured to be free of water and to store water vapor 240;
- a heater 215 located in the first portion 206, the heater 215 being configured to heat the water in the first portion 206 of the interior storage area of the water tank 205 to form water vapor 240, the formed water vapor 240 being stored in the second portion 207 of the interior storage area of the water tank 205;
- a wiper blade 225 located proximate to an interior windshield surface 250 of a windshield 260 of the vehicle, the wiper blade 225 being configured to wipe the interior windshield surface 250;
- a conduit 230 having an inlet opening in fluid communication with the second portion 207 of the interior storage area of the water tank 205, at least one outlet opening 226 connected to the wiper blade 225, and an elongated body extending between the inlet opening and the at least one outlet opening 226. A portion of the conduit 230 that includes the at least one outlet opening 226 can be connected to wiper blade 225 in a way that positions the at least one outlet opening 226 substantially flush with an exterior side surface of the wiper blade 225, in a way that causes the at least one outlet opening 226 to protrude from the exterior side surface of the wiper blade 225, or in any other way that enables water vapor to be ejected outwardly from the at least one outlet opening 226. The at least one outlet opening 226 may be oriented to direct water vapor 240 toward the interior windshield surface 250;
- a pump 220 mounted to the vehicle, the pump 220 being in fluid communication with the elongated body of the conduit 230, the pump 220 being configured to suction the water vapor 240 stored in the second portion 207 of the interior storage area of the water tank 205 via the inlet opening of the conduit 230, and to pump the suctioned water vapor 240 toward the at least one outlet opening 226 of the conduit 230; and
- a porous plenum 270 connected to the wiper blade 225 and movably engaged to the interior windshield surface 250. The porous plenum 270 covers the at least one outlet opening 226 of the conduit 230. The porous plenum 270 may extend between wiper blade 225 and the interior windshield surface 250.

The porous plenum 270, 270A is configured to receive water vapor 240 from the at least one covered outlet opening 226, to disperse the received water 240 vapor across its body, and to eject the dispersed water vapor 240 toward the interior windshield surface 250 to clean the interior windshield surface 250 by wiping said interior windshield surface 250, when the wiper blade 225 is used to wipe the interior windshield surface 250, and by ejecting the dispersed water vapor 240 onto the interior windshield surface 250.

The porous plenum 270 can be removably connected to the wiper blade 225 such that the porous plenum 270 can be replaced after wearing out, becoming clogged or otherwise having its cleaning efficiency reduced from use.

Alternatively, the porous plenum 270 can be fixedly connected to the wiper blade 225. In this case, the porous plenum 270 can be replaced together with the wiper blade 225 when wearing out, becoming clogged or otherwise becoming less effective at cleaning the interior windshield surface 250 from use.

Figure 6:
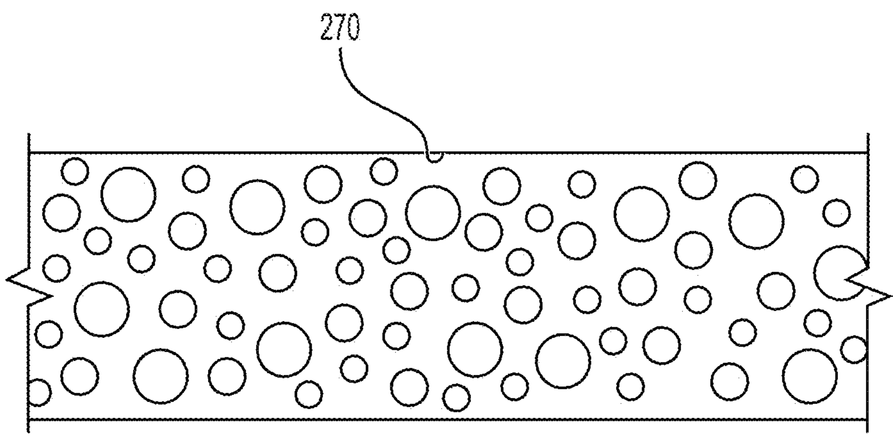
FIG. 6 is a side view illustrating a portion of a layer of porous plenum material usable in an interior windshield wiper system of a vehicle in accordance with an exemplary embodiment of the present subject matter.

The body of the porous plenum 270 includes at least one layer of porous material. For example, as illustrated in FIG. 6, the porous plenum 270 can include one layer of porous material.

Figure 7:
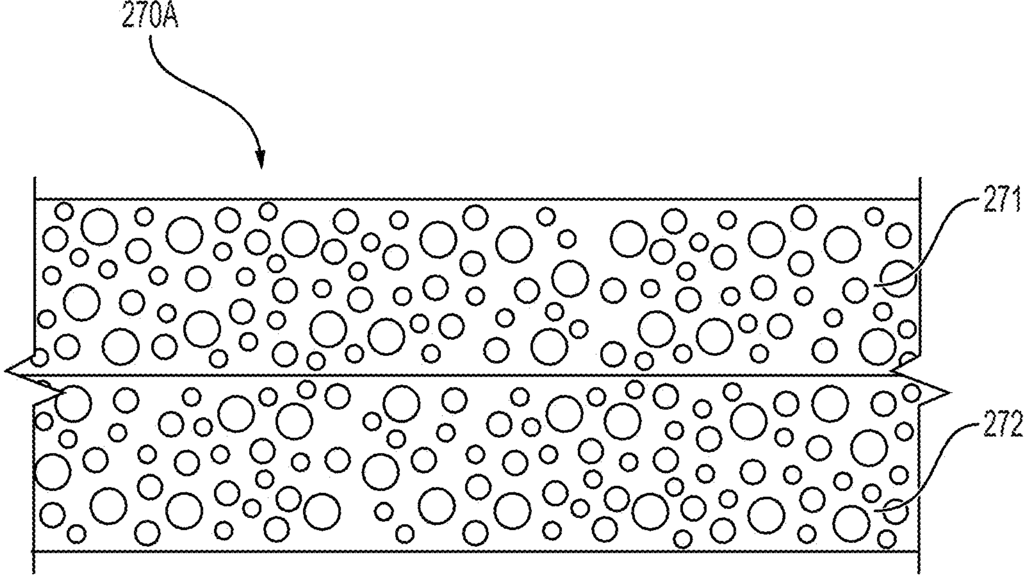
FIG. 7 is a side view illustrating a portion of a dual layer porous plenum material usable in an interior windshield wiper system of a vehicle in accordance with an exemplary embodiment of the present subject matter.

FIG. 7 exemplarily illustrates a porous plenum 270A that includes a first layer of porous material 271 and a second layer of porous material 272. A porous plenum that includes three or more layers of porous materials can also be used to cover the at least one opening 226 and to wipe the interior windshield surface 250, as taught in this specification.

In an approach, the first and second layers of porous material 271, 272 may have pores of substantially the same size as one another.

Alternatively, one of the first and second layer of porous material 271, 272 may have smaller pores than the other layer of porous material 271, 272. In an approach where the second layer of porous material 272 has smaller pores than first layer of porous material 271, the second layer of porous material 272 may be disposed between the first layer of porous material 271 and the interior windshield surface 250, or the first layer of porous material 217 may be disposed between the interior windshield surface 250 and the second layer of porous material 217.

In an approach, the porous plenum 270, 270A can be directly disposed on the interior windshield surface 250 to wipe the interior windshield surface 250. In a different approach, an intermittent layer of material that allows water vapor to travel across it may be disposed between the porous plenum 270, 270A and the interior windshield surface 250. The intermittent layer can be used, for example, to strengthen the connection between the porous plenum 270, 27A and the wiper blade 225.

The body of the porous plenum 270 may include an expanded polytetrafluoroethylene (ePTFE) membrane or an expanded polyethylene (ePE) membrane. For example, any one of the layers 270, 271, 272, etc., of a porous plenum as described in this specification can be made of an ePTFE or an ePE membrane. Each one of the ePTFE membrane and the ePE membrane may include about 9 billion pores per square inch.

Alternatively, or in addition, any one of the layers 270, 271, 272, etc., of a porous plenum as described in this specification can be made of an open-cell polymer sponge material. Non-limiting examples of the open-cell polymer sponge material include polyurethane or silicone-based sponges.

Alternatively, or in addition, any one of the layers 270, 271, 272, etc., of a porous plenum as described in this specification can be made of a fibrous woven material or a fibrous nonwoven material.

Alternatively, or in addition, any one of the layers 270, 271, 272, etc., of a porous plenum as described in this specification can be made of a porous sintered polymeric material. The porous sintered polymeric materials may include, as non-limiting example, polyethylene (PE), polypropylene (PP), polytetrafluoroethylene (PTFE), etc.

With the exception of the ePTFE membrane and the ePE membrane, which may include about 9 billion pores per square inch, the open-cell polymer sponge material, the fibrous woven material layer, the fibrous nonwoven material layer and the sintered polymeric material that can be used to form a porous plenum as described in this specification can have pores ranging from 0.01 mm in size (e.g., length) to about 10 mm in length, and preferably, pores ranging from about 0.1 mm in size to about 4 mm in size. However, the size of the pores of a porous plenum that excludes a ePTFE membrane and an ePE membrane can also be smaller than about 0.01 mm and/or greater than about 10 mm in size.

A porous plenum 270, 270A, etc., being made of a material as described in this specification and having pores of a size as described in this specification, promotes the even distribution of steam/water vapor throughout its body to evenly and effectively clean the interior windshield surface 250 while substantially preventing the condensation of the water vapor and virtually restricting the flow of water/liquid droplets therethrough, and as such, preventing drip.

The first layer of porous material 271 may be made of a different porous material than the second layer of porous material 272. In addition, the first layer of porous material 271 may have pores of a different size than the second layer of porous material 272.

A method of operating an interior windshield wiper system in a vehicle includes obtaining an interior windshield wiper system as described in this specification. For example, the method may include obtaining the interior windshield wiper system 200 and mounting said system 200 to a vehicle such that:

- the wiper blade 225 is located proximate to an interior windshield surface 250 of the vehicle; and
- the porous plenum 270, 270A is connected to the wiper blade 225, movably engages the interior windshield surface 250 and covers the at least one outlet opening hole 226 of the conduit 230 as described in this specification.

The method includes operating the pump 220 to pump water vapor 240 from the water tank 205 to the conduit 230 such that the at least one opening 226 of the conduit 230 can release the water vapor 240 from it, and that such the water vapor 240 released from the least one opening 226 passes through a body of the porous plenum 270, 270A.

The method also includes operating the wiping blade 225 to move along the interior windshield surface 250, enabling the porous plenum 270, 270A to wipe the interior windshield surface 250 with the water vapor 240 that passes through a body of the porous plenum 270, 270A.

The step of operating the pump 220 can be carried out before the step of operating the wiper blade 225, simultaneously with the step of operating the wiper blade 225 or subsequently to the step of operating the wiper blade 225.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. An interior windshield wiper system of a vehicle, comprising:

- a water tank mounted to the vehicle, the water tank having an interior storage area, the interior storage area having a first portion thereof configured to store water therein and a second portion thereof configured to be free of water and to store water vapor therein;
- a heater located in the first portion of the interior storage area of the water tank, the heater being configured to heat the water in the first portion of the interior storage area of the water tank to form water vapor, the formed water vapor being stored in the second portion of the interior storage area of the water tank;
- a wiper blade located proximate to an interior windshield surface of the vehicle, the wiper blade being configured to wipe the interior windshield surface;
- a conduit having an inlet opening in fluid communication with the second portion of the interior storage area of the water tank, at least one outlet opening connected to the wiper blade, and an elongated body extending between the inlet opening and the at least one outlet opening;
- a pump mounted to the vehicle, the pump being in fluid communication with the elongated body of the conduit, the pump being configured to suction the water vapor stored in the second portion of the interior storage area of the water tank via the inlet opening of the conduit, and to pump the suctioned water vapor toward the at least one outlet opening of the conduit; and
- a porous plenum connected to the wiper blade and movably engaged to the interior windshield surface, wherein the porous plenum covers the at least one outlet opening of the conduit, wherein the porous plenum is configured to receive water vapor from the at least one covered outlet opening, to disperse the received water vapor across its body, and to eject the dispersed water vapor toward the interior windshield surface to clean the interior windshield surface by wiping said interior windshield surface, when the wiper blade is used to wipe the interior windshield surface, and by ejecting the dispersed water vapor onto the interior windshield surface.

2. The system of claim 1, wherein the porous plenum is removably connected to the wiper blade.

3. The system of claim 1, wherein the porous plenum is fixedly connected to the wiper blade.

4. The system of claim 1, wherein the body of the porous plenum includes at least one layer of porous material.

5. The system of claim 4, wherein the body of the porous plenum includes a first layer of porous material and a second layer of porous material stacked on the first layer of porous material.

6. The system of claim 5, wherein the first and second layers of porous material have pores of a same size as one another.

7. The system of claim 5, wherein the second layer of porous material is disposed between the interior windshield surface and the first layer of porous material, and wherein the second layer of porous material has smaller pores than the first layer of porous material.

8. The system of claim 5, wherein the first and second layers of porous material are made of different material as one another.

9. The system of claim 1, wherein the body of the porous plenum includes an expanded polytetrafluoroethylene (ePTFE) membrane or an expanded polyethylene (ePE) membrane.

10. The system of claim 1, wherein the body of the porous plenum includes an open-cell polymer sponge material.

11. The system of claim 1, wherein the body of the porous plenum includes a fibrous woven or non-woven material layer.

12. The system of claim 1, wherein the body of the porous plenum includes a porous sintered polymeric material.

13. The system of claim 1, wherein the body of the porous plenum includes pores ranging from about 0.1 mm to about 4 mm in size.

* * * * *